US010196976B2

(12) United States Patent
Hughes et al.

(10) Patent No.: US 10,196,976 B2
(45) Date of Patent: Feb. 5, 2019

(54) SYSTEM AND METHOD FOR PRODUCING HYDROGEN RICH FUEL

(71) Applicant: General Electric Company, Schenectady, NY (US)

(72) Inventors: Michael John Hughes, Pittsburgh, PA (US); Jonathan Dwight Berry, Simpsonville, SC (US)

(73) Assignee: General Electric Company, Schenectady, NY (US)

(*) Notice: Subject to any disclaimer, the term of this patent is extended or adjusted under 35 U.S.C. 154(b) by 401 days.

(21) Appl. No.: 15/139,678

(22) Filed: Apr. 27, 2016

(65) Prior Publication Data

US 2016/0237893 A1 Aug. 18, 2016

Related U.S. Application Data

(63) Continuation of application No. 13/473,990, filed on May 17, 2012, now abandoned.

(51) Int. Cl.
*F02C 7/22* (2006.01)
*F02C 3/22* (2006.01)
(Continued)

(52) U.S. Cl.
CPC ............. *F02C 3/20* (2013.01); *C01B 3/38* (2013.01); *F02C 3/04* (2013.01); *F02C 3/22* (2013.01);
(Continued)

(58) Field of Classification Search
CPC ...... F02C 3/04; F02C 3/22; F02C 6/10; F02C 3/20; F02C 3/28; F02C 7/22; F05D 2210/20
See application file for complete search history.

(56) References Cited

U.S. PATENT DOCUMENTS

| 4,033,133 A | * | 7/1977 | Houseman | ............ C01B 3/386 123/179.8 |
| 5,103,630 A | * | 4/1992 | Correa | ............ F02C 3/28 60/39.17 |

(Continued)

FOREIGN PATENT DOCUMENTS

| JP | S61-106925 A | 5/1986 |
| JP | 2000-204965 A | 7/2000 |

(Continued)

OTHER PUBLICATIONS

Search Report issued in connection with corresponding JP Application No. 2013-101770 dated Mar. 15, 2017.

*Primary Examiner* — William H Rodriguez
*Assistant Examiner* — Eric Linderman
(74) *Attorney, Agent, or Firm* — Dority & Manning, P.A.

(57) ABSTRACT

A system for providing hydrogen enriched fuel includes first and second gas turbines. The second gas turbine receives a fuel from a fuel supply and portion of compressed working fluid from the first gas turbine and produces a reformed fuel, and a fuel skid provides fluid communication between a turbine in the second gas turbine and a combustor in the first gas turbine. A method for providing hydrogen enriched fuel includes diverting a portion of a first compressed working fluid from a first compressor to a second compressor and providing a second compressed working fluid from the second compressor. Mixing a first portion of a compressed fuel with the second compressed working fluid in a reformer to produce a reformed fuel, flowing a second portion of the compressed fuel to a second turbine for cooling, and flowing the reformed fuel through the second turbine to cool the reformed fuel.

20 Claims, 2 Drawing Sheets

(51) Int. Cl.
*F02C 3/20* (2006.01)
*C01B 3/38* (2006.01)
*F02C 3/04* (2006.01)
*F02C 6/10* (2006.01)

(52) U.S. Cl.
CPC ............... *F02C 6/10* (2013.01); *F02C 7/22* (2013.01); *C01B 2203/0227* (2013.01); *C01B 2203/84* (2013.01); *F05D 2210/20* (2013.01)

(56) References Cited

U.S. PATENT DOCUMENTS

| | | | | |
|---|---|---|---|---|
| 5,595,059 | A * | 1/1997 | Huber | F01K 23/10 122/7 B |
| 5,705,916 | A * | 1/1998 | Rudbeck | C01B 3/384 322/100 |
| 5,729,967 | A * | 3/1998 | Joos | F02C 3/28 60/39.12 |
| 5,904,040 | A * | 5/1999 | Hums | F02C 3/28 60/39.465 |
| 6,269,625 | B1 * | 8/2001 | Dibble | F02C 3/20 60/39.12 |
| 6,322,757 | B1 * | 11/2001 | Cohn | B01J 19/088 123/3 |
| 7,634,915 | B2 * | 12/2009 | Hoffmann | C01B 3/38 60/39.12 |
| 2009/0158701 | A1 * | 6/2009 | Hoffmann | F01K 23/068 60/39.12 |
| 2010/0175386 | A1 * | 7/2010 | Haynes | F02C 3/30 60/780 |
| 2011/0203291 | A1 * | 8/2011 | Erickson | F02C 7/224 60/776 |
| 2012/0055168 | A1 * | 3/2012 | Berry | F02C 3/28 60/780 |
| 2013/0305738 | A1 * | 11/2013 | Hughes | F02C 3/22 60/780 |
| 2014/0238039 | A1 * | 8/2014 | Zhang | F02C 7/236 60/778 |
| 2015/0321155 | A1 * | 11/2015 | Kim | C10L 3/06 366/148 |
| 2016/0333794 | A1 * | 11/2016 | Baladi | F02C 9/18 |

FOREIGN PATENT DOCUMENTS

| | | |
|---|---|---|
| JP | 2001-289008 A | 10/2001 |
| JP | 2002-004877 A | 1/2002 |
| JP | 2004-183602 A | 7/2004 |
| JP | 2005-098255 A | 4/2005 |
| WO | 2012/099046 A1 | 7/2012 |

* cited by examiner

SYSTEM AND METHOD FOR PRODUCING HYDROGEN RICH FUEL

CROSS REFERENCE TO RELATED APPLICATIONS

The present application claims filing benefit of U.S. patent application Ser. No. 13/473,990 having a filing date of May 17, 2012, which is incorporated by reference herein in its entirety.

FIELD OF THE INVENTION

The present invention relates generally to an integrated gas turbine system that produces hydrogen rich fuel for subsequent combustion or distribution.

BACKGROUND OF THE INVENTION

Gas turbines are widely used in industrial and power generation operations. A typical gas turbine includes an axial compressor at the front, one or more combustors around the middle, and a turbine at the rear. Ambient air enters the compressor, and rotating blades and stationary vanes in the compressor progressively impart kinetic energy to the working fluid (air) to produce a compressed working fluid at a highly energized state. The compressed working fluid exits the compressor and flows to the combustors where it mixes with fuel and ignites to generate combustion gases having a high temperature, pressure, and velocity. The combustion gases expand in the turbine to produce work. For example, expansion of the combustion gases in the turbine may rotate a shaft connected to a generator to produce electricity.

It is widely known that a leaner fuel-air mixture reduces the nitrous oxides produced from combustion. However, a leaner fuel-air mixture introduces flame instability in the combustor, increasing the chance of a lean blow out (LBO) event that might interrupt service provided by the gas turbine. The addition of hydrogen to the fuel can reduce the occurrence of lean blow out, improve emissions, and enhance the overall operation of most combustors, such as Dry Low NOx (DLN) combustors. Inasmuch as hydrogen is difficult to transport safely, an on-site production capability for the amount of hydrogen needed to supplement the fuel would be desirable. Various methods are known in the art for producing hydrogen on-site. For example, autothermal reformers (ATR) and steam methane reformers (SMR) may be used to produce a hydrogen enriched fuel. In general, these reformers expose a catalyst, such as nickel, to a fuel, such as natural gas, in a high temperature and pressure environment to produce pure hydrogen. As a result, the exothermic catalytic reaction produces a very high temperature exhaust that can present a problem for valves, seals, and other system components. Therefore, an integrated gas turbine system that can produce hydrogen enriched fuel on-site would be useful.

BRIEF DESCRIPTION OF THE INVENTION

Aspects and advantages of the invention are set forth below in the following description, or may be obvious from the description, or may be learned through practice of the invention.

One embodiment of the present invention is a system for providing hydrogen enriched fuel. The system includes a first gas turbine including a first compressor, wherein the first compressor produces a first compressed working fluid, a combustor downstream of the first compressor, a first turbine downstream of the combustor. The system further comprises a second gas turbine. The second gas turbine includes, a second compressor in fluid communication with the first compressor, wherein the second compressor receives a portion of the first compressed working fluid from the first compressor and produces a second compressed working fluid having a higher pressure than the first compressed working fluid. The second gas turbine further includes a fuel compressor in fluid communication with a fuel source and including an inlet and an outlet, wherein the fuel compressor receives a fuel through the inlet from the fuel source at a first pressure and a first temperature and provides a compresses fuel at a higher pressure and a higher temperature than the first pressure and the first temperature. A reformer is positioned downstream of the second compressor and the fuel compressor, wherein the reformer receives the second compressed working fluid and the compressed fuel and produces a reformed fuel. A second turbine is positioned downstream of the reformer, wherein the second turbine receives the reformed fuel and produces a cooled reformed fuel. A fuel skid in fluid communication with the second turbine and the combustor, provides a flow path for the cooled reformed fuel from the second turbine to the combustor.

Another embodiment of the present invention is a system for providing hydrogen enriched fuel that includes a low pressure compressor, a combustor downstream of the low pressure compressor and a low pressure turbine downstream of the combustor. The low pressure compressor produces a first compressed working fluid. A high pressure compressor is in fluid communication with the low pressure compressor. The high pressure compressor receives a portion of the first compressed working fluid and produces a second compressed working fluid having a higher pressure than the first compressed working fluid. A fuel compressor is downstream from the high pressure compressor and includes an inlet in fluid communication with a fuel source. The fuel compressor receives a fuel from the fuel source through the inlet at a first pressure and a first temperature and compresses the fuel to provide a compressed fuel at a higher pressure and a higher temperature. A reformer is downstream of the high pressure compressor and the fuel compressor. The reformer receives the second compressed working fluid and the compressed fuel produces a reformed fuel. A high pressure turbine is downstream of the reformer. The high pressure turbine receives the reformed fuel and produces a cooled reformed fuel. At least one shaft couples the low pressure compressor, the high pressure compressor, the fuel compressor, the high pressure turbine and the low pressure turbine. A fuel skid is in fluid communication with the combustor and the high pressure turbine and provides a flow path for the cooled reformed fuel from the high pressure turbine to the combustor.

The present invention also includes a method for providing hydrogen enriched fuel. The method includes diverting a portion of a first compressed working fluid from a first compressor to a second compressor and providing a second compressed working fluid from the second compressor. The method also includes providing a fuel to a fuel compressor at a first pressure and a first temperature and compressing the fuel to a second pressure and a second temperature. A first portion of the compressed fuel is provided to a reformer. A second portion of the compressed fuel flows from the fuel compressor to a second turbine to cool the second turbine. The compressed fuel is mixed with the second compressed working fluid in the reformer to produce a reformed fuel.

The reformed fuel flows through the second turbine to provide a cooled reformed fuel, and the cooled reformed fuel flows to a gas turbine combustor.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
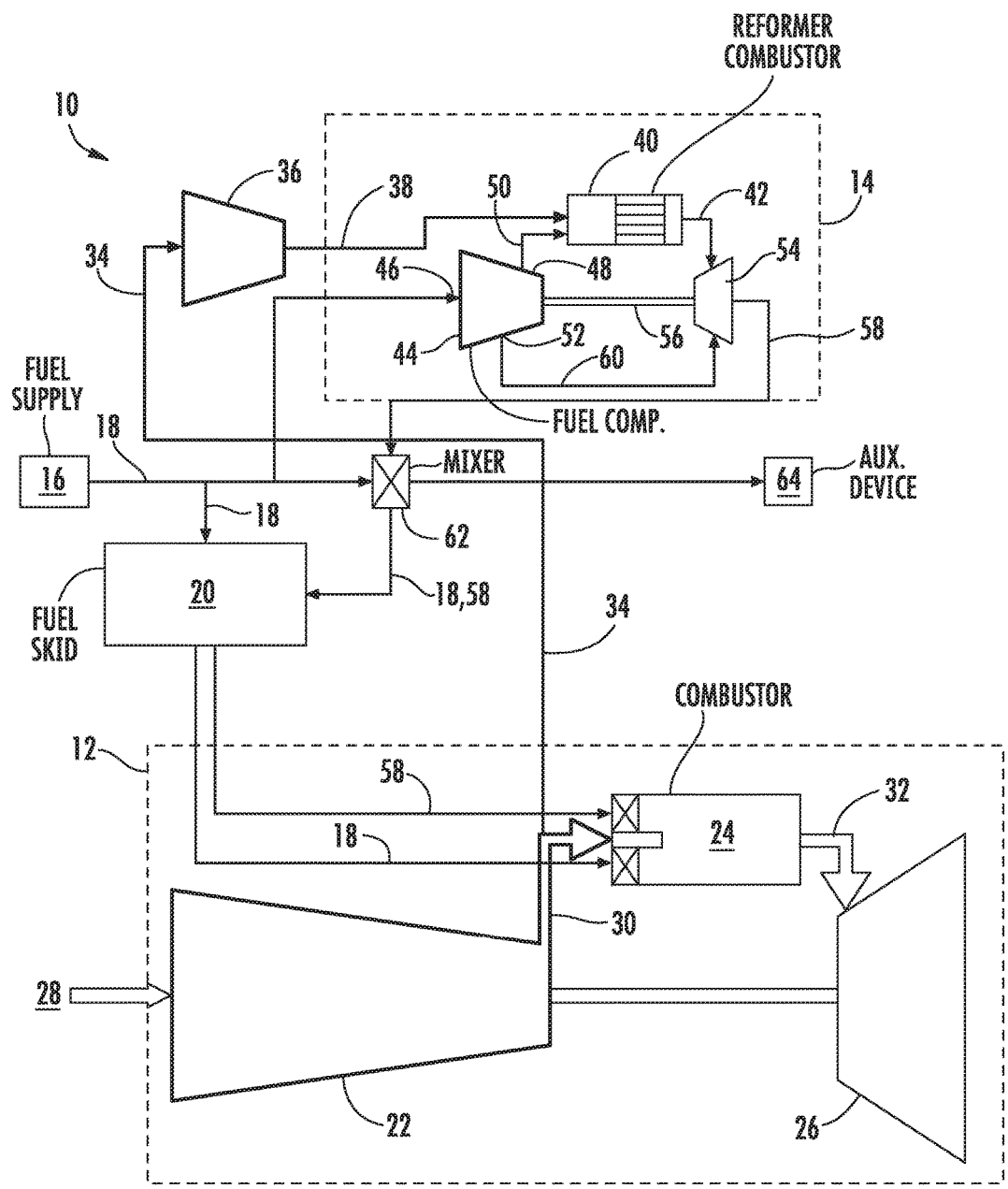
FIG. 1 provides a simplified block diagram of a system according to one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention utilize an integrated thermodynamic cycle to enhance the overall efficiency of a gas turbine. Specifically, the integrated thermodynamic cycle produces a reformed fuel from catalytic oxidation and recycles energy generated during the catalytic oxidation, thus improving the overall efficiency of the integrated gas turbine system.

FIG. 1 shows a system 10 according to one embodiment of the present invention. As shown, the system 10 generally includes a first or primary gas turbine 12 integrated with a second or micro-gas turbine 14. The first or primary gas turbine 12 may include any commercially available machine for combusting fuel to generate power. The second or micro-gas turbine 14 is generally an order of magnitude smaller than the first or primary gas turbine 12 and principally functions to reform or partially combust a fuel stream to produce a reformed fuel having enriched levels of hydrogen. A fuel supply 16 may supply a fuel 18 to a fuel skid 20. Possible fuels supplied to the fuel skid 20 include, for example, blast furnace gas, coke oven gas, natural gas, vaporized liquefied natural gas (LNG), and propane. The fuel skid 20 provides fluid communication for the fuel 18 to flow between the first and second gas turbines 12, 14, and/or multiple other gas turbines, as will be described.

The first gas turbine 12 generally includes a compressor 22, one or more combustors 24 downstream of the compressor 22, and a turbine 26 downstream of the combustors 24, as is known in the art. A working fluid 28, such as ambient air, enters the compressor 22, and rotating blades and stationary vanes in the compressor 22 progressively impart kinetic energy to the working fluid (air) to produce a first compressed working fluid, designated 30, at a highly energized state. The majority of the first compressed working fluid 30 exits the compressor 22 and flows to the combustors 24 where it mixes with fuel and ignites to generate combustion gases, designated 32, having a high temperature, pressure, and velocity. The combustion gases 32 flow to the turbine 26 and expand in the turbine 26 to produce work.

A portion of the first compressed working fluid, designated 34, is diverted from the compressor 22 and/or combustors 24 to the second gas turbine 14. The diverted portion of the first compressed working fluid 34 flows to a second compressor 36 in the second gas turbine 14. Rotating blades and stationary vanes in the second compressor 36 progressively impart kinetic energy to the diverted portion of the first compressed working fluid 34 to produce a second compressed working fluid, designated 38. The second compressed working fluid 38 naturally has a higher pressure and temperature than the diverted portion of the first compressed working fluid 34.

The second compressed working fluid 38 exits the second compressor 36 and flows to a reformer 40 downstream of the second compressor 36. The reformer 40 may comprise a catalyst, combustor, or other similar device known to one of ordinary skill in the art for oxidizing fuel to produce a reformed fuel, designated 42, having increased levels of hydrogen. For example, the reformer 40 may comprise a catalytic partial oxidation (CPDX) converter that uses one or more precious metals as the catalyst. In other embodiments, the reformer 40 may comprise a combustor.

The fuel supply 16 may provide the fuel 18 to the reformer 40, either directly, through the fuel skid 20 and/or through a fuel compressor 44 positioned upstream from the reformer 40 as shown in FIG. 1. The fuel compressor 44 may include any compressor known in the art suitable to compress a fuel. The fuel compressor 44 may also include an inlet 46 and an outlet 48 downstream from the inlet 46 and in fluid communication with the reformer 40. In particular embodiments, the fuel compressor 44 may receive the fuel 18 at a first temperature and a first pressure. As the fuel flows through the fuel compressor 44, the pressure and temperature increases, thus providing a compressed fuel 50 at a higher temperature and a higher pressure. The fuel compressor 44 may further include an extraction port 52 downstream from the inlet 46 for extracting at least a portion of the compressed fuel 50 from the fuel compressor 44.

The reformer 40 mixes the compressed fuel 50 with the second compressed working fluid 38 and/or catalyst so that the fuel-to-second compressed working fluid (air) has an equivalence ratio (Φ) greater than 1, and preferably greater than approximately 2, such as between approximately 2.5 and 6, to ensure a suitable hydrogen content in the reformed fuel 42. As used herein, the equivalence ratio (Φ) is defined as the ratio of the fuel-to-air ratio and the stoichiometric fuel-to-air ratio. Mathematically, the equivalence ratio may be calculated as follows:

$$\Phi = \frac{m_{fuel}/m_{air}}{(m_{fuel}/m_{air})_{st}}$$

where, m represents the mass and the suffix st stands for stoichiometric conditions.

The reformer 40 causes the compressed fuel 50 to react with the second compressed working fluid 38 to consume or scavenge all available oxygen and produce the reformed fuel 42 having a high temperature and pressure. The temperature of the reformed fuel 42 exiting the reformer 40 may be between approximately 1400° F. and 1700° F., and the pressure of the reformed fuel 42 exiting the reformer 40 may be between approximately 300 psi and 400 psi, although the present invention is not limited to any particular temperature range or pressure range for the reformed fuel 42 unless specifically recited in the claims. The hydrogen content in the reformed fuel 42 may be greater than approximately 5%, 10%, or 15% by volume, depending on the particular embodiment and operational needs.

The reformed fuel 42 flows to a second turbine 54 downstream of the reformer 40. The second turbine 54 may generally include a high pressure turbine. The reformed fuel 42 expands and cools in the second turbine 54 to produce work. Specifically, a shaft 56 may connect the second turbine 54 to the second compressor 36 to provide a driving engagement between the second turbine 54 and the second compressor 36. In this manner, the work generated by the expansion of the reformed fuel 42 in the second turbine 54 may be used to power, turn, or otherwise operate the fuel compressor 44, thereby enhancing the efficiency of the integrated system 10. In addition, the work generated by the expansion of the reformed fuel 42 through the second turbine may also be used to power, turn or otherwise operate the second compressor 36.

The reformed fuel 42 exits the second turbine 54 as a cooled reformed fuel 58. The temperature of the cooled reformed fuel 58 exiting the second turbine 54 may be between approximately 1000° F. and 1400° F., and the pressure of the cooled reformed fuel 58 exiting the second turbine 54 may be between approximately 200 psi and 300 psi. In particular embodiments, a coupling 60 may extend from the extraction port 52 of the fuel compressor 44 to the second turbine 54, thereby providing fluid communication from the fuel compressor 44 into the second turbine 54. In this manner, at least a portion of the compressed fuel 50 may flow from the fuel compressor 44 to the second turbine 54. As a result, the compressed fuel 50 may provide additional cooling to the second turbine 54, thereby further reducing the temperature of the cooled reformed fuel 58 exiting the second turbine 54. In addition, the compressed fuel 50 flowing through the second turbine 54 may reduce thermal stresses within the second turbine 54, thus increasing the mechanical life of the second turbine 54. As a result, the cooled reformed fuel 58 does not require additional cooling or pressure increase before introduction to the combustors 24. The hydrogen content in the cooled reformed fuel 58 may be greater than approximately 5%, 10%, or 15% by volume, depending on the particular embodiment and operational needs. The present invention is not limited to any particular temperature range or pressure range for the cooled reformed fuel 58 unless specifically recited in the claims.

Figure 2:
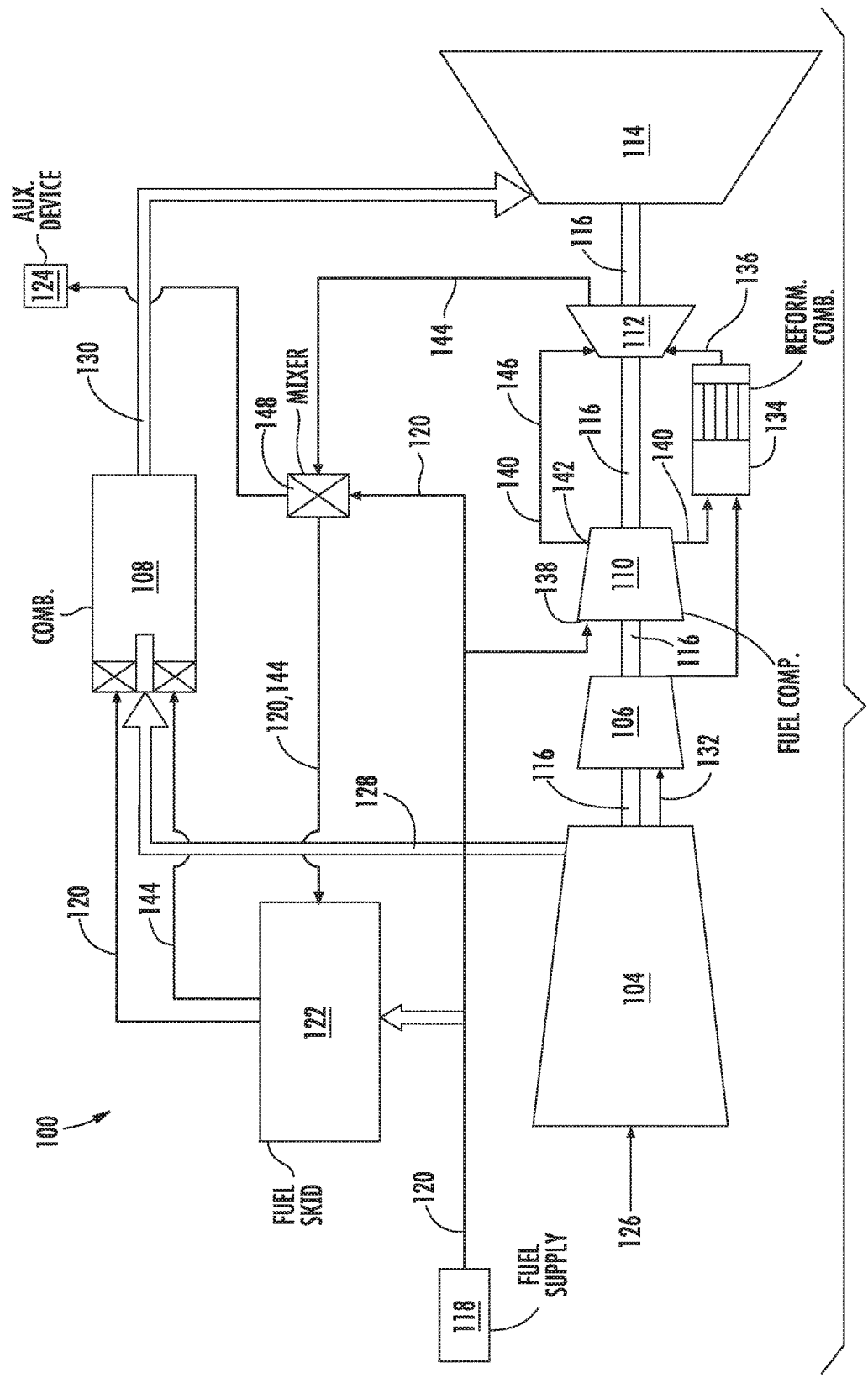
FIG. 2 provides a simplified block diagram of a system according to an alternate embodiment of the present invention.

The fuel skid 20 provides fluid communication between the second turbine 54 and the combustors 24. As a result, the cooled reformed fuel 58 may flow from the second turbine 54 through the fuel skid 20 to the combustors 24. The fuel skid 20 may provide the cooled reformed fuel 58 to the combustors 24 without any further adjustment or mixing. Alternately, or in addition, depending on the operational needs, the fuel skid 20 may mix the cooled reformed fuel 58 with the fuel 18 from the fuel supply 16. The mixing may also occur within a mixer 62 downstream from the second turbine 54 and upstream from the fuel skid 20 that provides fluid communication between the second turbine 54 and the fuel skid 20. In this manner, the fuel skid 20 may provide the fuel 18, cooled reformed fuel 58, and/or a mixture of the two to the combustors 24. The combustors 24 ignite the various fuels provided by the fuel skid 20 to generate combustion gases 32 which expand in the turbine 26 to produce work, as previously described. As shown in FIG. 1, the fuel skid 20 may also provide fluid communication between the second turbine 54 and an auxiliary process or device 64 such as another gas turbine other than the first gas turbine 12. This allows the system 10 to produce and supply hydrogen enriched fuel to more than one gas turbine at a site FIG. 2 shows a system 100 according to an alternate embodiment of the present invention. As shown, the system 100 generally includes a multi-spooled gas turbine 102 having a low pressure compressor 104, a high pressure compressor 106, one or more combustors 108, a fuel compressor 110, a high pressure turbine 112, and a low pressure turbine 114. At least one shaft 116 may couple the low pressure compressor 104, the high pressure compressor 106, the fuel compressor 110, the high pressure turbine 112 and/or the low pressure turbine 114. The shaft(s) 116 may be substantially concentric with each subsequent shaft(s) 116. A fuel supply 118 may supply a fuel 120 to a fuel skid 122. The fuel skid 122 may provide fluid communication between the high pressure turbine 112, the combustors 108, and/or multiple other gas turbines 124, as will be described.

A working fluid 126, such as ambient air, enters the low pressure compressor 104 and rotating blades and stationary vanes (not shown) in the low pressure compressor 104 progressively impart kinetic energy to the working fluid 126 to produce a first compressed working fluid, designated 128, at a highly energized state. The majority of the first compressed working fluid 128 exits the low pressure compressor 104 and flows to the combustors 108 where it mixes with the fuel 120 and ignites to generate combustion gases, designated 130, having a high temperature, pressure, and velocity. The combustion gases 130 flow to the low pressure turbine 114 and expand in the low pressure turbine 114 to produce work.

A portion of the first compressed working fluid 128 may be diverted from the low pressure compressor 104 and/or the combustors 108 to the high pressure compressor 106 downstream of the low pressure compressor 104. Rotating blades and stationary vanes (not shown) in the high pressure compressor 106 progressively impart kinetic energy to the diverted portion of the first compressed working fluid 128 to produce a second compressed working fluid, designated 132. The second compressed working fluid 132 naturally has a higher pressure and temperature than the diverted portion of the first compressed working fluid 128. The second compressed working fluid 132 exits the high pressure compressor 106 and flows to a reformer 134 downstream of the high pressure compressor 106. The reformer 134 may comprise a catalyst, combustor, or other similar device known to one of ordinary skill in the art for oxidizing fuel to produce a reformed fuel, designated 136, having increased levels of hydrogen. For example, the reformer 134 may comprise a catalytic partial oxidation (CPDX) converter that uses one or more precious metals as the catalyst. In other embodiments, the reformer 134 may comprise a combustor.

The fuel supply 118 may provide the fuel 120 to the reformer 134, either directly, through the fuel skid 122 and/or through the fuel compressor 110. The fuel compressor 110 may include any rotatable compressor known in the art suitable to compress a fuel. The fuel compressor 110 may also include an inlet 138 in fluid communication with the fuel supply 118 and/or the fuel skid 122. In particular embodiments, the fuel compressor 110 may receive the fuel 120 through the inlet 138 at a first temperature and a first pressure. As the fuel 120 flows through the fuel compressor 110, the pressure and temperature increases, thus providing a compressed fuel 140 at a higher temperature and a higher pressure. At least a portion of the compressed fuel 140 flows from the fuel compressor 110 to the reformer 134. The fuel compressor 110 may further include an extraction port 142 downstream from the inlet 138 for extracting at least a portion of the compressed fuel 140 from the fuel compressor 110.

The reformer 134 mixes the compressed fuel 140 with the second compressed working fluid 132 and/or catalyst so that the fuel-to-second compressed working fluid (air) has an equivalence ratio (Φ) greater than 1, and preferably greater than approximately 2, such as between approximately 2.5 and 6, to ensure a suitable hydrogen content in the reformed fuel 136. The reformer 134 causes the compressed fuel 140 to react with the second compressed working fluid 132 to consume or scavenge all available oxygen and produce the reformed fuel 136 having a high temperature and pressure. The temperature of the reformed fuel 136 exiting the reformer 134 may be between approximately 1400° F. and 1700° F., and the pressure of the reformed fuel 136 exiting the reformer 134 may be between approximately 300 psi and 400 psi, although the present invention is not limited to any particular temperature range or pressure range for the reformed fuel 136 unless specifically recited in the claims. The hydrogen content in the reformed fuel 136 may be greater than approximately 5%, 10%, or 15% by volume, depending on the particular embodiment and operational needs.

The reformed fuel 136 flows to the high pressure turbine 112 downstream of the reformer 134. The reformed fuel 136 expands and cools in the high pressure turbine 112 to produce work. Specifically, the shaft(s) 116 may provide a driving engagement between the high pressure turbine 112, the fuel compressor 110, the high pressure compressor 106 and the low pressure compressor 104. In this manner, the work generated by the expansion of the reformed fuel 136 in the high pressure turbine 112 may be used to power, turn, or otherwise operate the fuel compressor 110, the high pressure compressor 106 and/or the low pressure compressor 104 thereby enhancing the efficiency of the integrated system 100. The reformed fuel 136 exits the high pressure turbine 112 as a cooled reformed fuel 144. The temperature of the cooled reformed fuel 144 exiting the high pressure turbine 112 may be between approximately 1000° F. and 1400° F., and the pressure of the cooled reformed fuel 144 exiting the high pressure turbine 112 may be between approximately 200 psi and 300 psi, although the present invention is not limited to any particular temperature range or pressure range for the cooled reformed fuel 144 unless specifically recited in the claims. In particular embodiments, a coupling 146 may extend from the extraction port 142 to the high pressure turbine 112, thereby providing fluid communication from the fuel compressor 110 to the high pressure turbine 112. In this manner, at least a portion of the compressed fuel 140 may flow from the fuel compressor 110 to the high pressure turbine 112. As a result, the compressed fuel 140 may provide additional cooling to the high pressure turbine 112, thereby further reducing the temperature of the cooled reformed fuel 144 exiting the high pressure turbine 112. In addition, the compressed fuel 140 flowing through the high pressure turbine 112 may reduce thermal stresses within the high pressure turbine 112, thus increasing the mechanical life of the high pressure turbine 112. As a result, the cooled reformed fuel 144 does not require additional cooling or pressure increase before introduction to the combustors 108. The hydrogen content in the cooled reformed fuel 144 may be greater than approximately 5%, 10%, or 15% by volume, depending on the particular embodiment and operational needs.

The fuel skid 122 provides fluid communication between the high pressure turbine 112 and the combustors 108. As a result, the cooled reformed fuel 144 may flow from the high pressure turbine 112 through the fuel skid 122 to the combustors 108. The fuel skid 122 may provide the cooled reformed fuel 144 to the combustors 108 without any further adjustment or mixing. Alternately, or in addition, depending on the operational needs, the fuel skid 122 may mix the cooled reformed fuel 144 with the fuel 120 from the fuel supply 118. The mixing may also occur within a mixer 148 downstream from the high pressure turbine 112 and upstream from the fuel skid 122 that provides fluid communication between the high pressure turbine 112 and the fuel skid 122. In this manner, the fuel skid 122 may provide the fuel 120, cooled reformed fuel 144, and/or a mixture of the two, designated as 120,144 to the combustors 108. The combustors 108 ignite the various fuels provided by the fuel skid 122 to generate combustion gases 130 which expand in the low pressure turbine 114 to produce work, as previously described. As shown in FIG. 2, the fuel skid 122 may also provide fluid communication to another gas turbine 124 other than the multi-spooled gas turbine 102. This allows the system 100 to produce and supply hydrogen enriched fuel to more than one gas turbine at a site. In addition or in the alternative, the system 10 may provide at least a portion of the hydrogen enriched fuel for use in an auxiliary process or device 64 such as another gas turbine.

The systems described and illustrated in FIGS. 1 and 2 provide a method for providing hydrogen enriched fuel. Specifically, the method may include diverting a portion of a first compressed working fluid from a first compressor to a second compressor. The first compressed working fluid may be further compressed by the second compressor, thus providing a second compressed working fluid. A fuel may be supplied to a fuel compressor at a first pressure and a first temperature where it may be compressed to a second pressure and a second temperature. At least a first portion of the compressed fuel may be diverted to a reformer downstream from the fuel compressor, and a second portion of the compressed fuel may be diverted from the fuel compressor to a second turbine to cool the second turbine. The compressed fuel and the working fluid at the second pressure and temperature may then be mixed in a reformer to produce a reformed fuel. If desired, the equivalence ratio between the compressed fuel and the second compressed working fluid may be greater than 2. The reformed fuel may be produced with hydrogen concentration of greater than 5% by volume. The reformed fuel may then flow into the second turbine to provide a cooled reformed fuel. The cooled reformed fuel may then flow to a gas turbine combustor for combustion. The method may further include mixing the cooled reformed fuel the fuel from the fuel supply, in the fuel skid and/or within a mixer before it is distributed to the combustor.

The systems and methods described in the present invention may provide several commercial advantages over existing technology. For example, integrating the reformer and reforming process into a conventional gas turbine system should increase the overall efficiency of the gas turbine system by allowing work performed by the reforming process to be captured or recycled. Compressing the fuel before it enters the reformer enhances the reaction within the reformer, thereby increasing the efficiency of the process. Cooling the second/high pressure turbine with the compressed fuel decreases the thermal stresses found within the second/high pressure turbine, thereby resulting in increased period between outages. The recycling or capturing of the work from the reforming process allows for the reformed fuel to be cooled, reducing the difficulty and cost associated with transporting or transferring the reformed fuel. In addition, a single reforming process integrated into a gas turbine system may provide sufficient hydrogen enriched fuel for multiple gas turbines at a site. In addition or in the alternative, the system 10 may provide at least a portion of the hydrogen enriched fuel for use in an auxiliary process or device 64 such as another gas turbine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal languages of the claims.

What is claimed is:

1. A system for cooling hydrogen enriched fuel;
an air compressor, wherein the air compressor provides a stream of compressed air;
a fuel compressor in fluid communication with a fuel supply, wherein the fuel compressor generates a first stream of compressed fuel and a second stream of compressed fuel;
a fuel reformer in fluid communication with the air compressor and the fuel compressor, wherein the fuel reformer receives the compressed air from the air compressor and the first stream of compressed fuel from the fuel compressor and generates a stream of hydrogen enriched fuel;
an expansion turbine disposed immediately downstream from the fuel reformer, wherein the expansion turbine receives the stream of hydrogen enriched fuel from the fuel reformer, wherein the expansion turbine is fluidly coupled to the fuel compressor via a fluid coupling and wherein the second stream of compressed fuel flows directly from the fuel compressor into the expansion turbine and is mixed with the hydrogen enriched fuel to provide a stream of cooled hydrogen enriched fuel.

2. The system as in claim 1, further comprising a mixer disposed downstream from the expansion turbine and fluidly coupled to the fuel supply, wherein fuel from the fuel supply and the stream of cooled hydrogen enriched fuel mix within the mixer.

3. The system as in claim 1, wherein the stream of hydrogen enriched fuel comprises at least 5% by volume hydrogen.

4. The system as in claim 1, wherein the stream of cooled hydrogen enriched fuel is at least between one thousand degrees Fahrenheit and one thousand four hundred degrees Fahrenheit.

5. The system as in claim 1, wherein the fuel reformer comprises a catalyst.

6. The system as in claim 1, further comprising a fuel skid fluidly coupled to the fuel supply and to the expansion turbine, wherein the fuel skid and receives the cooled hydrogen enriched fuel from the expansion turbine and a secondary stream of fuel from the fuel supply.

7. The system as in claim 6, wherein the fuel skid is fluidly coupled to a combustor of a gas turbine, wherein the combustor receives the stream of cooled hydrogen enriched gas and the stream of secondary fuel from the fuel skid.

8. The system as in claim 1, wherein the expansion turbine is mechanically coupled to the fuel compressor via a rotor shaft, wherein expansion of the hydrogen enriched fuel within the expansion turbine causes the rotor shaft to rotate and drive the fuel compressor.

9. The system as in claim 1, wherein the expansion turbine is fluidly coupled to an auxiliary device of a gas turbine plant.

10. A system for cooling hydrogen enriched fuel, comprising:
a gas turbine comprising, in serial flow order, a first air compressor, a combustor and a turbine;
a second air compressor in fluid communication with the first air compressor;
a fuel compressor in fluid communication with a fuel supply, wherein the fuel compressor generates a first stream of compressed fuel and a second stream of compressed fuel;
a fuel reformer in fluid communication with the second air compressor and the fuel compressor, wherein the fuel reformer receives a stream of compressed air from the second air compressor and the first stream of compressed fuel from the fuel compressor and generates a stream of hydrogen enriched fuel;
an expansion turbine disposed immediately downstream from the fuel reformer, wherein the expansion turbine receives the stream of hydrogen enriched fuel from the fuel reformer, wherein the expansion turbine is fluidly coupled to the fuel compressor via a fluid coupling, wherein the second stream of compressed fuel flows directly from the fuel compressor into the expansion turbine and is mixed with the hydrogen enriched fuel within the expansion turbine to provide a stream of cooled hydrogen enriched fuel to the combustor.

11. The system as in claim 10, further comprising a mixer disposed downstream from the expansion turbine and fluidly coupled to the fuel supply and to the combustor of the gas turbine, wherein fuel from the fuel supply and the stream of cooled hydrogen enriched fuel mix within the mixer.

12. The system as in claim 10, wherein the stream of hydrogen enriched fuel comprises at least 5% by volume hydrogen.

13. The system as in claim 10, wherein the stream of cooled hydrogen enriched fuel is between one thousand degrees Fahrenheit and one thousand four hundred degrees Fahrenheit.

14. The system as in claim 10, wherein the fuel reformer comprises a catalyst.

15. The system as in claim 10, further comprising a fuel skid fluidly coupled to the fuel supply, the expansion turbine and to the combustor of the gas turbine, wherein the fuel skid and receives the cooled hydrogen enriched fuel from the expansion turbine and a secondary stream of fuel from the fuel supply.

16. The system as in claim 15, wherein the combustor receives the stream of cooled hydrogen enriched gas and the stream of secondary fuel from the fuel skid.

17. The system as in claim 10, wherein the expansion turbine is fluidly coupled to an auxiliary device of a gas turbine plant.

18. The system as in claim 17, wherein the auxiliary device is a secondary gas turbine.

19. The system as in claim 10, wherein the expansion turbine is mechanically coupled to the fuel compressor via a rotor shaft, wherein expansion of the hydrogen enriched fuel within the expansion turbine causes the rotor shaft to rotate and drive the fuel compressor.

20. The system as in claim 10, wherein the first compressor, the second compressor, the expansion turbine and the turbine of the gas turbine are mechanically coupled via a common rotor shaft.

* * * * *